United States Patent
Keicho et al.

(10) Patent No.: US 11,422,414 B2
(45) Date of Patent: Aug. 23, 2022

(54) LIQUID CRYSTAL LIGHT DEFLECTION APPARATUS AND METHOD OF MANUFACTURING LIQUID CRYSTAL LIGHT DEFLECTION APPARATUS

(71) Applicants: Tianma Japan, Ltd., Kanagawa (JP); Wuhan Tianma Micro-Electronics Co., Ltd., Wuhan (CN)

(72) Inventors: Yukie Keicho, Kanagawa (JP); Jin Matsushima, Kanagawa (JP); Tetsushi Sato, Kanagawa (JP)

(73) Assignees: TIANMA JAPAN, LTD., Kawasaki (JP); Wuhan Tianma Micro-Electronics Co., Ltd., Wuhan (CN)

(*) Notice: Subject to any disclaimer, the term of this patent is extended or adjusted under 35 U.S.C. 154(b) by 0 days.

(21) Appl. No.: 17/126,137

(22) Filed: Dec. 18, 2020

(65) Prior Publication Data

US 2021/0200041 A1    Jul. 1, 2021

(30) Foreign Application Priority Data

Dec. 26, 2019  (JP) .............................. JP2019-236025

(51) Int. Cl.
G02F 1/1343    (2006.01)
G02B 30/28    (2020.01)
G02F 1/137    (2006.01)

(52) U.S. Cl.
CPC ....... *G02F 1/134309* (2013.01); *G02B 30/28* (2020.01); *G02F 1/137* (2013.01)

(58) Field of Classification Search
None
See application file for complete search history.

(56) References Cited

U.S. PATENT DOCUMENTS

| | | | |
|---|---|---|---|
| 2006/0153997 A1* | 7/2006 | Rankin, Jr. | G02F 1/13718 428/1.5 |
| 2012/0287388 A1* | 11/2012 | Inenaga | B32B 27/00 349/122 |
| 2014/0168556 A1* | 6/2014 | Liu | H01L 29/66969 349/43 |
| 2017/0125604 A1* | 5/2017 | Oshima | H01L 29/66969 |
| 2017/0160600 A1* | 6/2017 | Galstian | G02F 1/137 |
| 2018/0031947 A1* | 2/2018 | Shibuya | G02F 1/29 |

FOREIGN PATENT DOCUMENTS

JP    2011-017742 A    1/2011

* cited by examiner

*Primary Examiner* — Ryan Crockett
(74) *Attorney, Agent, or Firm* — Sughrue Mion, PLLC (57) ABSTRACT

A liquid crystal light deflection apparatus includes a first substrate including a first electrode, a second substrate including a second electrode, and liquid crystals sandwiched between the first substrate and the second substrate. A high-resistivity layer is provided on at least one of the first electrode or the second electrode. The high-resistivity layer is covered sequentially by a first barrier layer formed from metal oxide and a second barrier layer formed from metal nitride or metal carbide.

7 Claims, 11 Drawing Sheets

MATERIALS AND THICKNESSES

| Layer | Material | Thickness(nm) | |
|---|---|---|---|
| | | Embodiment Examples 1 and 2 | Comparative Examples 1 and 2 |
| Second barrier layer | Silicon nitride | 200 | – |
| First barrier layer | Silicon oxide | 100 | – |
| High-resistivity layer | AZO | 50 | 50 |
| Insulation layer | Silicon oxide | 100 | 100 |
| First electrode and second electrode | ITO | 40 | 40 |

LIQUID CRYSTAL LIGHT DEFLECTION APPARATUS AND METHOD OF MANUFACTURING LIQUID CRYSTAL LIGHT DEFLECTION APPARATUS

CROSS-REFERENCE TO RELATED APPLICATION

This application claims the benefit of Japanese Patent Application No. 2019-236025, filed on Dec. 26, 2019, the entire disclosure of which is incorporated by reference herein.

FIELD

This application relates to a liquid crystal light deflection apparatus and a method of manufacturing the liquid crystal light deflection apparatus.

BACKGROUND

A liquid crystal light deflection apparatus that acts as a lens, prism, and the like, generates a light deflection effect by changing an alignment of liquid crystals is known. For example, Unexamined Japanese Patent Application Publication No. 2011-17742 discloses a low-voltage driving liquid crystal lens that includes a first substrate having a first electrode, a second electrode and a liquid crystal layer interposed between the first base and the second electrode. With the low-voltage driving liquid crystal lens of the Unexamined Japanese Patent Application Publication No. 2011-17742, the alignment of the liquid crystal layer changes when voltage is applied across the first electrode and the second electrode. As a result, a light deflection effect occurs in the low-voltage driven liquid crystal lens. Thus, the low-voltage driving liquid crystal lens acts on light as a convex lens or a concave lens.

In the Unexamined Japanese Patent Application Publication No. 2011-17742, a drive voltage of the liquid crystal lens is lowered by placing a high-resistivity layer on a side facing a liquid crystal layer of a transparent insulation layer disposed between the second electrode and the liquid crystal layer. With the low-voltage driving liquid crystal lens of Unexamined Japanese Patent Application Publication No. 2011-17742, there is risk of the light deflection effect (that is, the focal length) can changing over time due to deterioration of the high-resistivity layer caused by moisture, heat or the like because the high-resistivity layer is formed from zinc oxide, titanium oxide, and the like.

SUMMARY

A liquid crystal light deflection apparatus in a first aspect of the disclosure includes:
 a first substrate including a first electrode;
 a second substrate including a second electrode; and
 liquid crystals sandwiched between the first substrate and the second substrate,
 wherein
 a high-resistivity layer is provided on at least one of the first electrode or the second electrode, and
 the high-resistivity layer is covered sequentially by a first barrier layer formed from metal oxide and a second barrier layer formed from metal nitride or metal carbide.

A method of manufacturing a liquid crystal light deflection apparatus in a second aspect of the disclosure includes:
 preparing a first substrate including a first electrode and a second substrate including a second electrode;
 forming a high-resistivity layer on at least one of the first electrode or the second electrode;
 forming a first barrier layer from of a metal oxide to cover the high-resistivity layer such that surfaces of the high-resistivity layer are unexposed from the first barrier layer; and
 forming a second barrier layer from metal nitride or metal carbide on the first barrier layer.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which.

DETAILED DESCRIPTION

Hereinafter, a liquid crystal light deflection apparatus according to embodiments is described with reference to the drawings.

Embodiment 1

Figure 1:
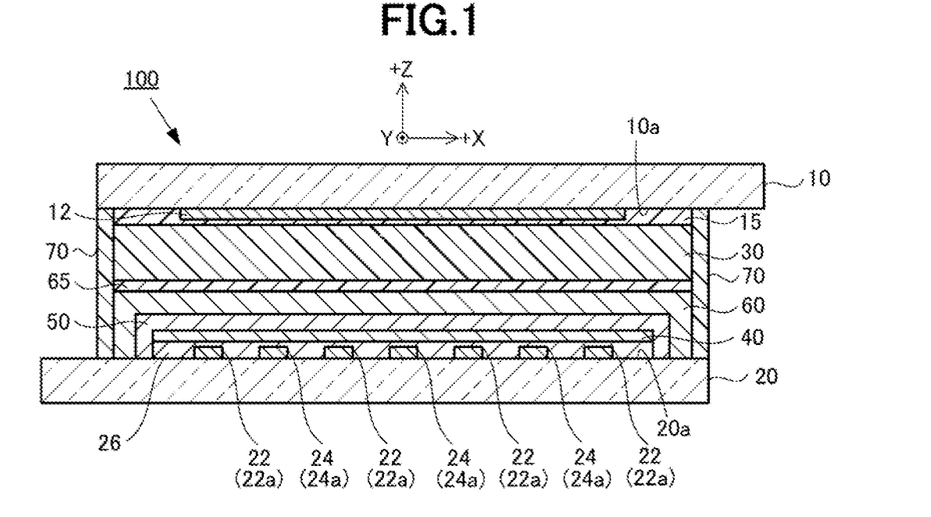
FIG. 1 is a diagram illustrating a cross-sectional of a liquid crystal light deflection apparatus according to Embodiment 1.

A liquid crystal light deflection apparatus 100 according to the present embodiment is described with reference to FIG. 1 to FIG. 4. The liquid crystal light deflection apparatus 100, as illustrated in FIG. 1, includes a first substrate 10, a second substrate 20, and liquid crystals 30. The first substrate 10 includes a first electrode 12 and an alignment film 15. The second substrate 20 includes second electrodes 22 and 24, an insulation layer 26, a high-resistivity layer 40, a first barrier layer 50, a second barrier layer 60, and an alignment film 65. The high-resistivity layer 40 is provided on the second electrodes 22 and 24. Furthermore, the high-resistivity layer 40 is covered sequentially by the first barrier 50 and the second barrier layer 60. With the liquid crystal light deflection apparatus 100, a light deflection effect is generated by changes in the alignment of the liquid crystals 30. The liquid crystal light deflection apparatus 100 acts on light as a lenticular lens due to the light deflection effect. The liquid crystal light deflection apparatus 100 is, for example, mounted on a liquid crystal display panel. The liquid crystal light deflection apparatus 100 is used as a lenticular lens array that switches a display image to be displayed on the liquid crystal display between a planar image and three-dimensional image. In the disclosure, in order to facilitate understanding, the longitudinal right direction (the direction toward the right of FIG. 1) of the liquid crystal light deflection apparatus 100 in FIG. 1 is defined as +X direction, the upward direction (direction toward the top of FIG. 1) is defined as +Z direction, and the direction perpendicular to the +X and +Z directions (the direction toward the front of FIG. 1) is defined as +Y direction.

The first substrate 10 has transparency. In the present embodiment, the first substrate 10 enables visible light to pass therethrough. The first substrate 10 is, for example, a flat plate substrate made of glass. The first substrate 10 and the second substrate 20 are joined together by a sealant material 70. The first substrate 10 and the second substrate 20 sandwich the liquid crystals 30 therebetween. The first substrate 10 includes the first electrode 12 and the alignment film 15.

The first electrode 12 of the first substrate 10 is rectangularly formed upon a first main surface 10a of the first substrate 10 from indium tin oxide (ITO). The first electrode 12 opposes a comb-like teeth portion 22a of the second electrode 22 and a comb-like teeth portion 24a of the second electrode 24, which are described further below. The first electrode 12 is connected to a non-illustrated controller.

The alignment film 15 of the first substrate 10 is provided on the first main surface 10a and the first electrode 12. The alignment film 15 causes the liquid crystals 30 to align in the X direction. The alignment film 15 is, for example, a polyimide alignment film that is subjected to rubbing processing.

The second substrate 20, similar to the first substrate 10, has transparency. In the present embodiment, the second substrate 20 enables the visible light to pass therethrough. The second substrate 20 is, for example, a flat plate substrate made of glass. The second substrate 20 and the first substrate 10 are joined together by the sealant material 70, thereby sandwiching the liquid crystals 30. The second substrate 20 includes the two second electrodes 22 and 24, the insulation layer 26, the high-resistivity layer 40, the first barrier layer 50, the second barrier layer 60, and the alignment film 65. The insulation layer 26, the high-resistivity layer 40, the first barrier layer 50, and the second barrier layer 60 enables the visible light to pass therethrough.

Figure 2:
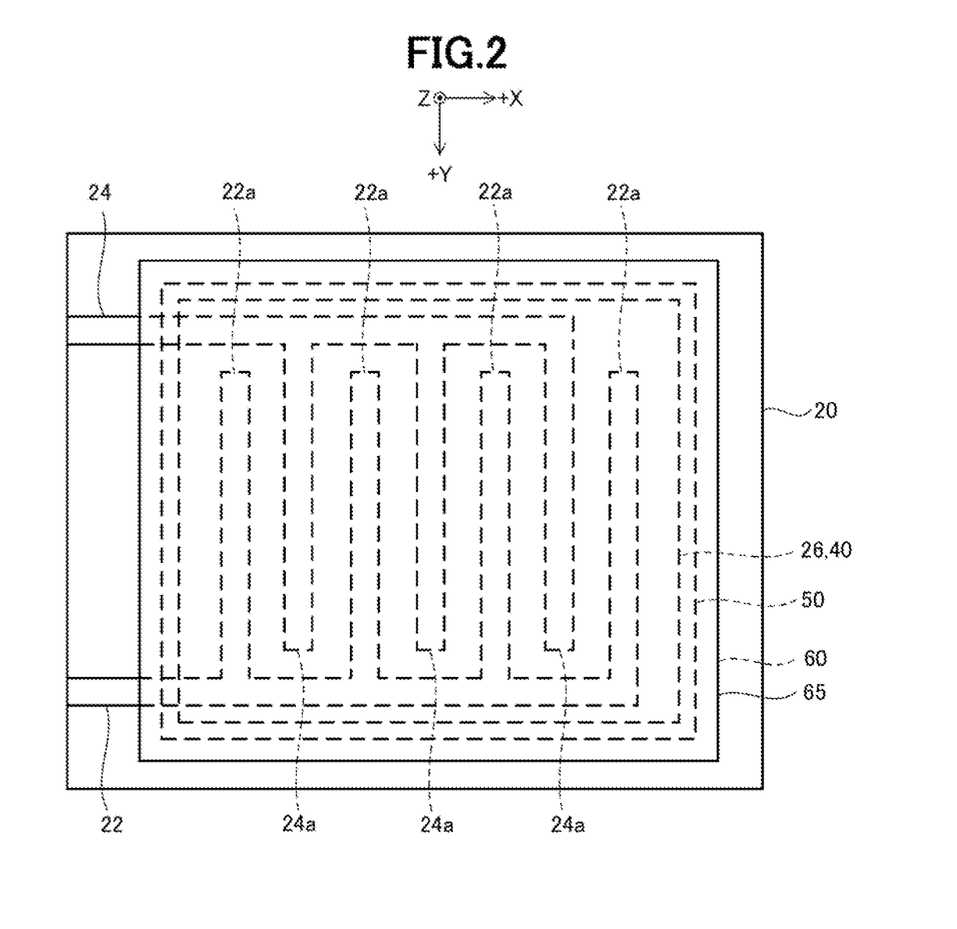
FIG. 2 is a top view of a second substrate according to Embodiment 1.

The second electrode 22 and the second electrode 24 of the second substrate 20 are formed from ITO into comb-like teeth upon the first main surface 20a of the second substrate 20. The second electrode 22 and the second electrode 24, as illustrated in FIG. 2 have the comb-like teeth portion 22a and the comb-like teeth portion 24a, respectively. The comb-like teeth portion 22a extends in the +Y direction and the comb-like teeth portion 24a extends in the −Y direction. The comb-like teeth portion 22a and the comb-like teeth portion 24a are placed alternatingly and parallel to one another in the X direction.

The second electrodes 22 and 24, as illustrated in FIG. 1 and FIG. 2 are covered by the insulation layer 26. The second electrodes 22 and 24, similar to the first electrode 12, are connected to the controller.

The insulation layer 26 of the second substrate 20, as illustrated in FIG. 1, covers the second electrodes 22 and 24. The insulation layer 26 insulates the second electrodes 22 and 24 from the high-resistivity layer 40. The insulation layer 26 is formed from silicon oxide ($SiO_2$), aluminum nitride (AlN), silicon nitride ($SiN_x$), magnesium fluoride ($MgF_2$), and the like. The insulation layer 26 is, for example, a silicon oxide film. The thickness of the insulation layer 26 is, for example, 50 nm to 1000 nm.

The high-resistivity layer 40 of the second substrate 20 is provided on the second electrodes 22 and 24 via the insulation layer 26. The high-resistivity layer 40 is covered sequentially by the first barrier layer 50 and the second barrier layer 60. The high-resistivity layer 40 has, for example, a sheet resistance value of $1 \times 10^6$ Ω/sq to $1 \times 10^{14}$ Ω/sq. The high-resistivity layer 40 is formed from Al doped zinc oxide (AZO), zinc oxide (ZnO), indium tin (InSn) oxide, magnesium oxide (MgO), and the like. The high-resistivity layer 40 is, for example, an AZO film. The high-resistivity layer 40 has a thickness of 20 nm to 500 nm, for example.

The first barrier layer 50 of the second substrate 20 covers the high-resistivity layer 40. The first barrier layer 50 preferably covers not only a top surface (surface on the +Z side) but also the side surfaces of the high-resistivity layer 40, as illustrated in FIG. 1. Furthermore, the first barrier layer 50 preferably covers the high-resistivity layer 40 such that surfaces of the high-resistivity layer 40 are unexposed from the first barrier layer 50. The first barrier layer 50 protects the high-resistivity layer 40 in a case where the second barrier layer 60 is to be formed as described further below.

The first barrier layer 50 is formed from metal oxides. Examples of the metal oxides include silicon oxide, aluminum oxide (AlOx), tantalum oxide ($TaO_x$), niobium oxide ($NbO_x$), titanium oxide ($TiO_2$), zirconium oxide ($ZrO_2$), mixtures thereof, and the like. The first barrier layer 50 is, for example, a silicon oxide film. The first barrier layer 50 has a thickness of 10 nm to 500 nm, for example.

The second barrier layer 60 of the second substrate 20 covers the first barrier layer 50 and the high-resistivity layer 40. The second barrier layer 60 preferably covers not only the top surface (surface on the +Z side) but also the side surfaces of the first barrier layer 50, as illustrated in FIG. 1. Furthermore, it is preferable that the second barrier layer 60 and the high-resistivity layer 40 are not in contact with each other. The second barrier layer 60 is formed from metal nitrides or metal carbides. Examples of metal nitrides and metal carbides include silicon nitride, silicon oxynitride (SiON), silicon carbon nitride (SiCN), silicon carbide (SiC), mixtures thereof, and the like. The second barrier layer 60 is, for example, a silicon nitride film. The second barrier layer 60 has a thickness of 50 nm to 500 nm, for example.

The second barrier layer 60 protects the high-resistivity layer 40 from moisture because the second barrier layer 60 is formed from metal nitrides or metal carbides that have excellent moisture barrier properties, and thus can prevent or suppress deterioration of the high-resistivity layer 40. In the present embodiment, since the second barrier layer 60 can prevent or suppress deterioration of the high-resistivity layer 40, the light deflection effect (the focal length) of the liquid crystal light deflection apparatus 100 can be prevented or suppressed from changing over time. When the second barrier layer 60 formed from metal nitrides or metal carbides is formed directly upon the high-resistivity layer 40, there is risk of the resistance value of the high-resistivity layer 40 changing due to decomposition products (hydrogen gas, for example) generated in the formation of the second barrier layer 60. In the present embodiment, since the first barrier layer 50 is covering the high-resistivity layer 40, the resistance value of the high-resistivity layer 40 during film forming process of the second barrier layer 60 can be prevented or suppressed from changing. Moreover, the yield in the manufacturing of the liquid crystal light deflection apparatus 100 can be improved.

The alignment film 65 of the second substrate 20 is provided on the second barrier layer 60. The alignment film 65, similar to the alignment film 15 of the first substrate 10, causes the liquid crystals 30 to align in the X direction. The alignment film 65 is, for example, a polyimide alignment film that is subjected to rubbing processing.

The liquid crystals 30 are sandwiched between the first substrate 10 and the second substrate 20. The liquid crystals 30 are, for example, positive type nematic liquid crystals. The liquid crystals 30 are aligned in the X direction by the alignment film 15 and the alignment film 65.

Here, the operation of the liquid crystal light deflection apparatus 100 is described.

For example, when potentials of the first electrode 12 of the first substrate 10 and the second electrodes 22 and 24 of the second substrate 20 are brought to the same potential (ground potential, for example) by the controller, voltage is not applied to the liquid crystals 30, and thus the liquid crystals 30 remain aligned in the X direction. While the liquid crystals 30 are kept aligned in the X direction, no deflection effect is generated, and thus the liquid crystal light deflection apparatus 100 does not act on light as a lens.

Figure 3:
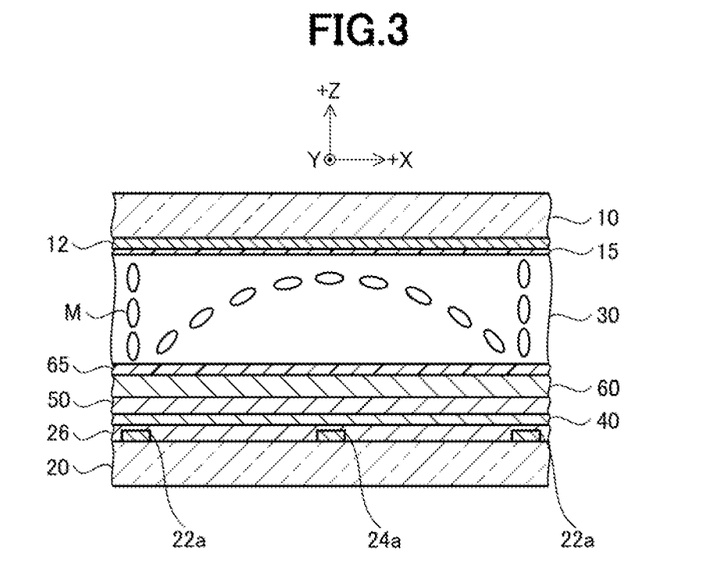
FIG. 3 is a schematic diagram for illustrating operation of the liquid crystal light deflection apparatus according to Embodiment 1.

Independently controlling the voltage applied across the first electrode 12 of the first substrate 10 and the second electrode 22 of the second substrate 20 and the voltage applied across the first electrode 12 of the first substrate 10 and the second electrode 24 of the second substrate 20 causes a potential in a quadratic curve shape to be formed between the first substrate 10 and the second substrate 20. The potential formed in the quadratic curve shape causes molecules M of the liquid crystals 30 to align as illustrated in FIG. 3. This change in the alignment of the liquid crystals 30 generates a refractive index distribution along the potential in the quadratic curve shape in the liquid crystal light deflection apparatus 100. The refractive index distribution along the potential in the quadratic curve shape generates a deflection effect in the liquid crystal light deflection apparatus 100. By doing so, the liquid crystal light deflection apparatus 100 acts on the light as a lens.

Figure 4:
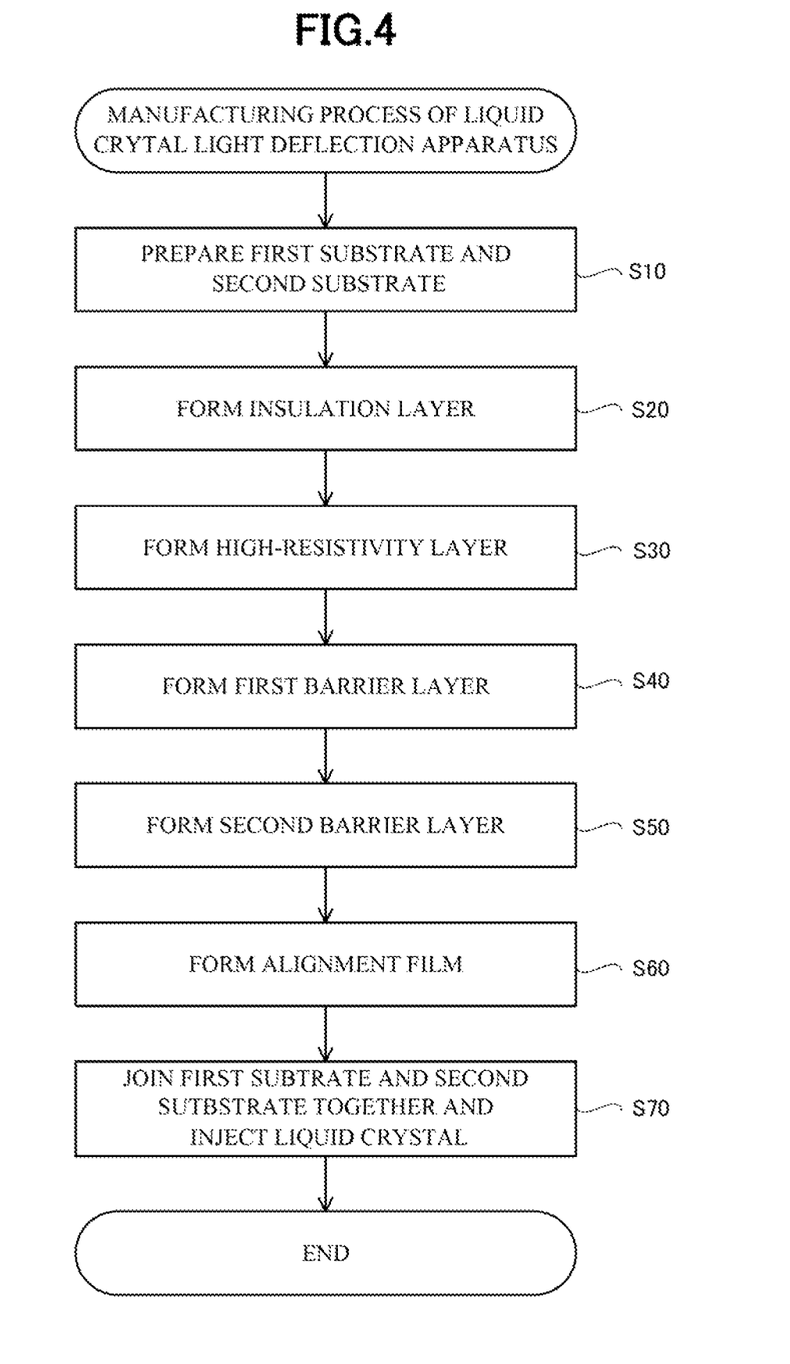
FIG. 4 is a flowchart illustrating a method of manufacturing the liquid crystal light deflection apparatus according to Embodiment 1.

Next, the method of manufacturing the liquid crystal light deflection apparatus 100 is described with reference to FIG. 4. FIG. 4 is a flowchart illustrating the manufacturing process of the liquid crystal light deflection apparatus 100. The manufacturing process of the liquid crystal light deflection apparatus 100 includes a step of preparing the first substrate 10 and the second substrate 20 (step S10), a step of forming the insulation layer 26 (step S20), a step of forming the high-resistivity layer 40 (step S30), a step of forming the first barrier layer 50 from metal oxides (step S40), and a step of forming the second barrier layer 60 from metal nitrides or metal carbides. (step S50). The method of manufacturing the liquid crystal light deflection apparatus 100 further includes a step of forming the alignment film 15 and the alignment film 65 (step S60), and a step of joining together the first substrate 10 and the second substrate 20 and injecting the liquid crystals 30 therebetween (step S70).

In step S10, the first substrate 10 including the first electrode 12 and the second substrate 20 including the second electrodes 22 and 24 are prepared. The first electrode 12 and the second electrodes 22 and 24 are formed from ITO by using a sputtering technique, for example.

In step S20, the insulation layer 26 is formed upon the second electrodes 22 and 24 of the second substrate 20. The insulation layer 26 is formed from silicon oxide by using a sputtering technique, for example.

In step S30, the high-resistivity layer 40 is formed upon the insulation layer 26. By doing so, the high-resistivity layer 40 is provided on the second electrodes 22 and 24 via the insulation layer 26. The high-resistivity layer 40 is formed from AZO by using a sputtering technique, for example.

In step S40, the first barrier layer 50 is formed by covering the high-resistivity layer 40 such that the surfaces of the high-resistivity layer 40 are unexposed. The first barrier layer 50 is formed from metal oxides. The first barrier layer 50 is, for example, a silicon oxide film formed by chemical vapor deposition (CVD). In the present embodiment, since the first barrier layer 50 covers the high-resistivity layer 40, the first barrier layer 50 protects the high-resistivity layer 40 from decomposition products (hydrogen gas, for example) that is generated during the formation of the second barrier layer 60 (step S50), and thus can prevent or suppress changes in the resistance value of the high-resistivity layer 40. Therefore, the yield in the manufacturing of the liquid crystal light deflection apparatus 100 can be improved.

In step S50, the second barrier layer 60 is formed upon the first barrier layer 50. By doing so, the high-resistivity layer 40 is covered sequentially by the first barrier layer 50 and the second barrier layer 60. The second barrier layer 60 is formed from metal nitrides or metal carbides. The second barrier layer 60 is, for example, a silicon nitride film formed by CVD. In the present embodiment, the high-resistivity layer 40 is protected from moisture because the second barrier layer 60 covers the high-resistivity layer 40, and thus deterioration of the high-resistivity layer 40 can be prevented or suppressed. Furthermore, the light deflection effect (focal length) of the liquid crystal light deflection apparatus 100 can be prevented from changing over time.

In step S60, the alignment film 15 is formed upon the first electrode 12 of the first substrate 10, and the alignment film 65 is formed upon the second barrier layer 60. In step S60, a polyimide film is formed first by applying a polyimide material to the first electrode 12 and/or the second barrier layer 60, and then firing the applied polyimide material. Then, the alignment films 15 and 65 are formed by performing rubbing processing on the polyimide thin film.

In step S70, the first substrate 10 and the second substrate 20 are joined together by the sealant material 70 via a non-illustrated spacer. Then, the liquid crystals 30 is injected between the first substrate 10 and the second substrate 20. As described, the liquid crystal light deflection apparatus 100 can be manufactured.

As described above, since the second barrier layer 60 having excellent moisture barrier properties protects the high-resistivity layer 40 from moisture, deterioration of the high-resistivity layer 40 can be prevented or suppressed, and the light deflection effect (focal length) of the liquid crystal light deflection apparatus 100 can be prevented or suppressed from changing over time. Also, since the first barrier layer 50 covers the high-resistivity layer 40 the resistance value of the high-resistivity layer 40 during the film forming process of the second barrier layer 60 can be prevented or suppressed from changing. Moreover, the yield in the manufacturing of the liquid crystal light deflection apparatus 100 can be improved.

In a case where only the first barrier layer 50 covers the high-resistivity layer 40, it is necessary to increase the thickness of the first barrier layer 50 in order to protect the high-resistivity layer 40 from moisture. Therefore, when the high-resistivity layer 40 is covered by only the first barrier layer 50, the drive voltage rises. Also, the time taken for the first barrier layer 50 to form increases. In the present embodiment, since the second barrier layer 60 covers the high-resistivity layer 40, the thickness of the first barrier layer 50 can be decreased. Therefore, the time taken for the first barrier layer 50 to form can be shortened. Also, the drive voltage of the liquid crystal light deflection apparatus 100 can be reduced. Furthermore, the drive voltage of the liquid crystal light deflection apparatus 100 can be easily reduced by increasing the relative permittivity of one of the first barrier 50 and the second barrier layer 60.

Embodiment 2

In Embodiment 1, although the liquid crystal light deflection apparatus 100 acts on light as a lens, the liquid crystal light deflection apparatus 100 may act on light as a prism.

Figure 5:
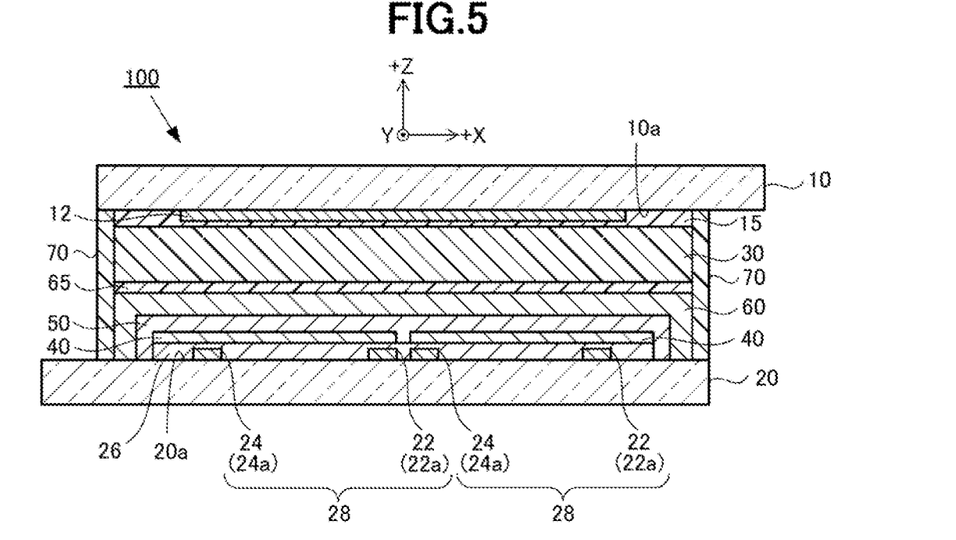
FIG. 5 is a schematic diagram illustrating a cross section of a liquid crystal light deflection apparatus according to Embodiment 2.

With the liquid crystal light deflection apparatus 100 of the present embodiment, a light deflection effect is generated by changes in the alignment of the liquid crystals 30. The liquid crystal light deflection apparatus 100 of the present embodiment acts on light as a prism. In the present embodiment, the configuration of the second electrodes 22 and 24 of the second substrate 20 and the high-resistivity layer 40 is different from the configuration of second electrodes 22 and 24 of the second substrate 20 and the high-resistivity layer 40 of Embodiment 1. The other aspects of the configuration of the present embodiment are similar to those in Embodiment 1. Here, the second electrodes 22 and 24 of the second substrate 20 and the high-resistivity layer 40 are described.

Figure 6:
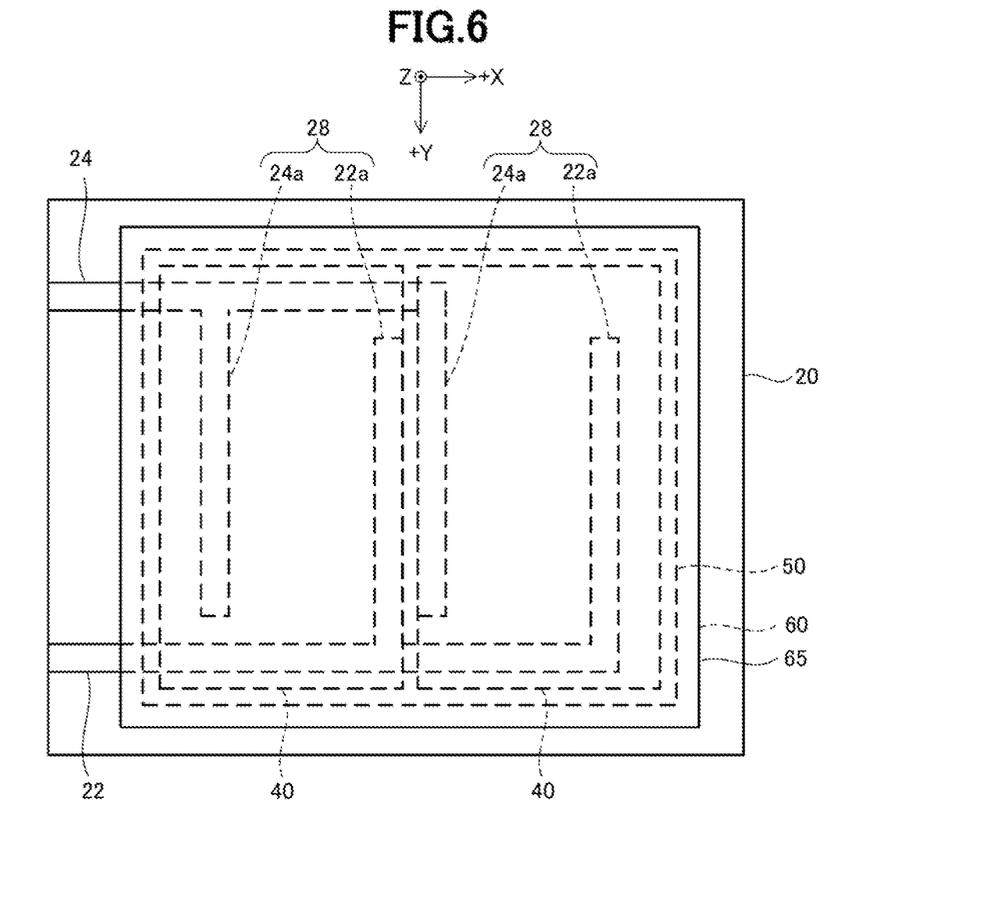
FIG. 6 is a top view of a second substrate according to Embodiment 2.

The second electrodes 22 and 24 of the second substrate 20 of the present embodiment, similar to the second electrodes 22 and 24 of the Embodiment 1, are formed from ITO into comb-like teeth upon the first main surface 20a of the second substrate 20. The second electrode 22 and the second electrode 24 respectively have the comb-like teeth portion 22a extending in the +Y direction and the comb-like teeth portion 24a extending in the −Y direction. The comb-like teeth portion 22a and the comb-like teeth portion 24a, similar to the comb-like teeth portion 22a and the comb-like teeth portion 24a of Embodiment 1, are placed alternatingly and parallel to one another in the X direction. In the present embodiment, the comb-like teeth portions 22a and the comb-like teeth portions 24a form electrode pairs 28 and a comb-like teeth portion 22a of one electrode pair 28 is placed adjacent to a comb-like teeth portion 24a of the other electrode pair 28, as illustrated in FIG. 5 and FIG. 6. In FIG. 6, the insulation layer 26 is omitted to facilitate understanding.

In the present embodiment, the second substrate 20 includes two high-resistivity layers 40, as illustrated in FIG. 5 and FIG. 6. Each of the high-resistivity layers 40 is provided on one electrode pair 28 (comb-like teeth portion 22a of the second electrode 22 and comb-like teeth portion 24a of the second electrode 24) via the insulation layer 26.

Next, the operation of the liquid crystal light deflection apparatus 100 of the present embodiment is described.

Similar to the liquid crystal light deflection apparatus 100 of Embodiment 1, when potentials of the first electrode 12 of the first substrate 10 and the second electrodes 22 and 24 of the second substrate 20 are brought to the same potential (ground potential, for example), the liquid crystals 30 remain aligned in the X direction. While the liquid crystals 30 are kept aligned in the X direction, no deflection effect is generated, and thus the liquid crystal light deflection apparatus 100 does not act on light as a prism.

Figure 7:
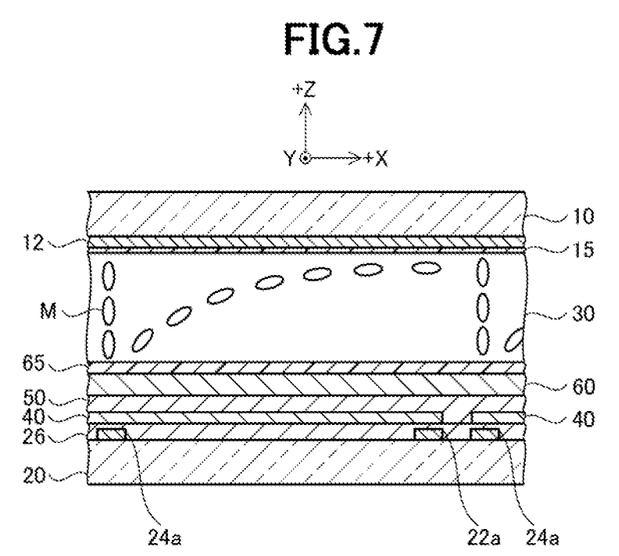
FIG. 7 is a schematic diagram for illustrating operation of the liquid crystal light deflection apparatus according to Embodiment 2.

Independent controlling the voltage applied across the first electrode 12 of the first substrate 10 and the second electrode 22 of the second substrate 20 and the voltage applied across the first electrode 12 of the first substrate 10 and the second electrode 24 of the second substrate 20 causes potential gradient between the comb-like teeth portion 22a and the comb-like teeth portion 24a of one electrode pair 28 to be formed. For example, assuming the first electrode 12 is the ground potential (0V), a first voltage is applied to the second electrode 22 and a second voltage that is greater than the first voltage is applied to the second electrode 24. In this case, a linear potential gradient is formed between the comb-like teeth portion 22a and the comb-like teeth portion 24a of one electrode pair 28 because the high-resistivity layer 40 is provided on one electrode pair 28 via the insulation layer 26. The molecules M of the liquid crystals 30 align as illustrated in FIG. 7 due to the formed linearly potential gradient. This change in alignment of the liquid crystals 30 generates a linearly refractive index gradient. Thus, the liquid crystal light deflection apparatus 100 refracts light incident from the first substrate 10 or the second substrate 20. That is, the liquid crystal light deflection apparatus 100 of the present embodiment acts on light as a prism.

As described above, in the liquid crystal light deflection apparatus 100 of the present embodiment, a light deflection effect is generated by changes in the alignment of the liquid crystals 30. The liquid crystal light deflection apparatus 100 of the present embodiment acts as on light as a prism. Also, similar to that in Embodiment 1, since the second barrier layer 60 having excellent moisture barrier properties protects the high-resistivity layer 40 from moisture, deterioration of the high-resistivity layer 40 can be prevented or suppressed, and the light deflection effect (deflection angle or refraction angle) of the liquid crystal light deflection apparatus 100 can be prevented or suppressed from changing over time. Since the first barrier layer 50 covers the high-resistivity layer 40, the resistance value of the high-resistivity layer 40 during the film forming process of the second barrier layer 60 can be prevented or suppressed from changing. Moreover, the yield in the manufacturing of the liquid crystal light deflection apparatus 100 can be improved. Furthermore, similar to that in Embodiment 1, the time taken for the first barrier layer 50 to form can be shortened and the drive voltage of the liquid crystal light deflection apparatus 100 can be reduced.

Modified Examples

The above-described embodiments can be modified in various manners without departing from the gist of the disclosure.

Figure 8:
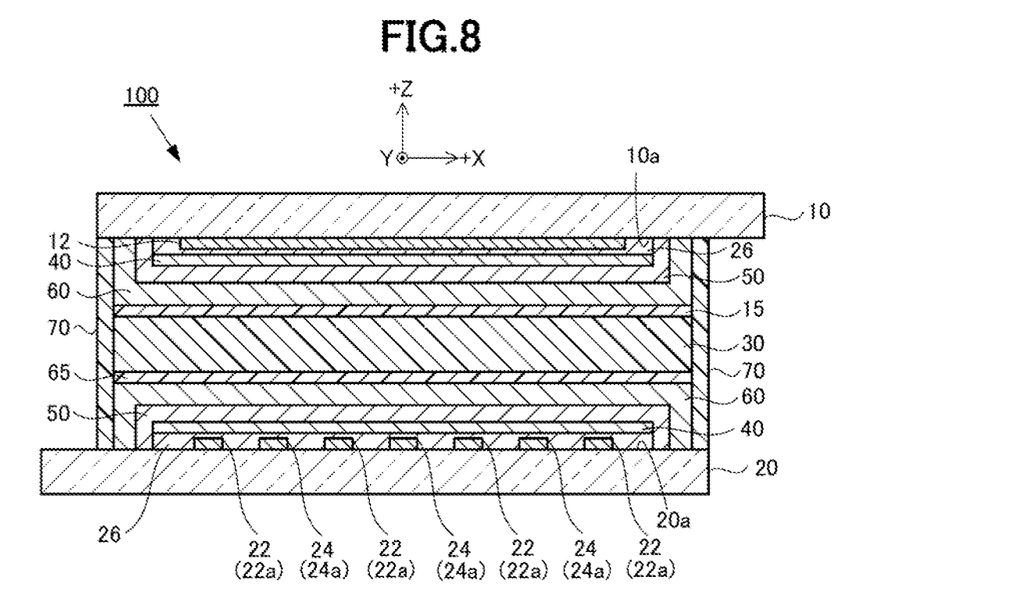
FIG. 8 is a schematic diagram for illustrating a cross section of a liquid crystal light deflection apparatus according to a modified example.

In Embodiments 1 and 2, the high-resistivity layer 40 provided on the second electrodes 22 and 24 of the second substrate 20 is covered sequentially by the first barrier layer 50 and the second barrier layer 60. It is sufficient as long as the high-resistivity layer 40 is provided on at least one of the first electrode 12 of the first substrate 10 or the second electrodes 22 and 24 of the second substrate 20, and is covered sequentially by the first barrier layer 50 and the second barrier layer 60. For example, as illustrated in FIG. 8, the high-resistivity layer 40 provided on the first electrode 12 and the high-resistivity layer 40 provided on the second electrodes 22 and 24 may each be covered sequentially by the first barrier layer 50 and the second barrier layer 60.

Figure 9:
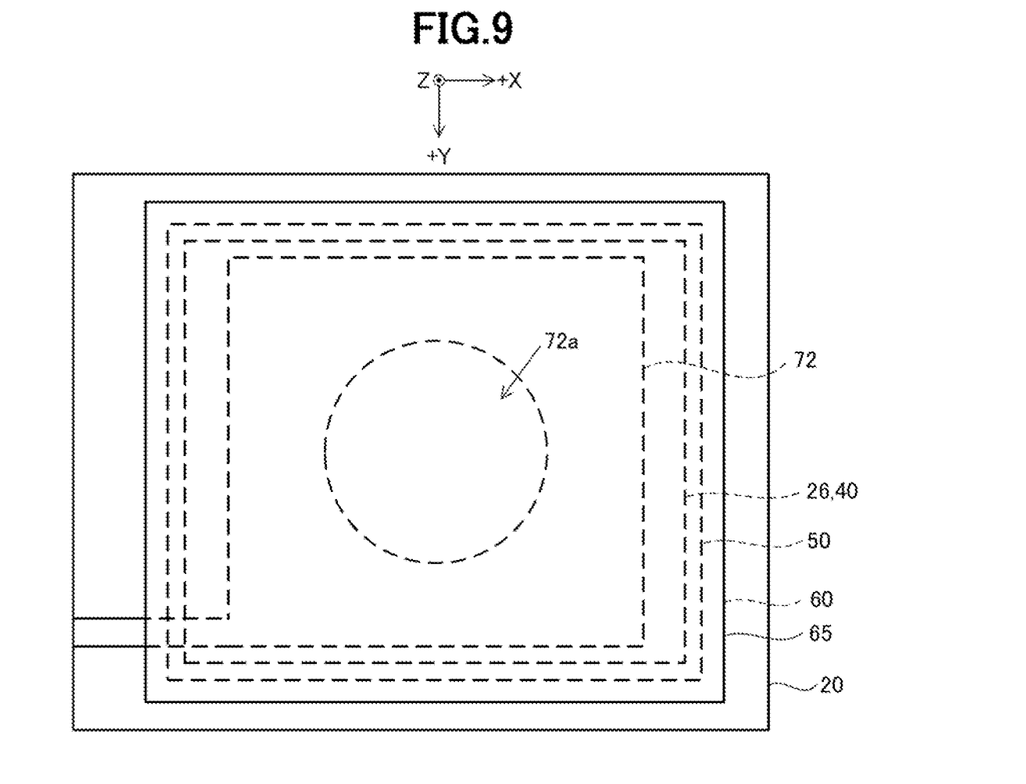
FIG. 9 is a diagram illustrating a second electrode of a second substrate according to a modified example.

The electrode to be provided on the first substrate 10 and the second substrate 20 may be any shape. For example, the second substrate 20 of Embodiment 1 may include a second electrode 72 provided with an opening 72a as illustrated in FIG. 9 instead of the second electrodes 22 and 24. In this case, the liquid crystal light deflection apparatus 100 acts on light as one convex lens or one concave lens.

Figure 10:
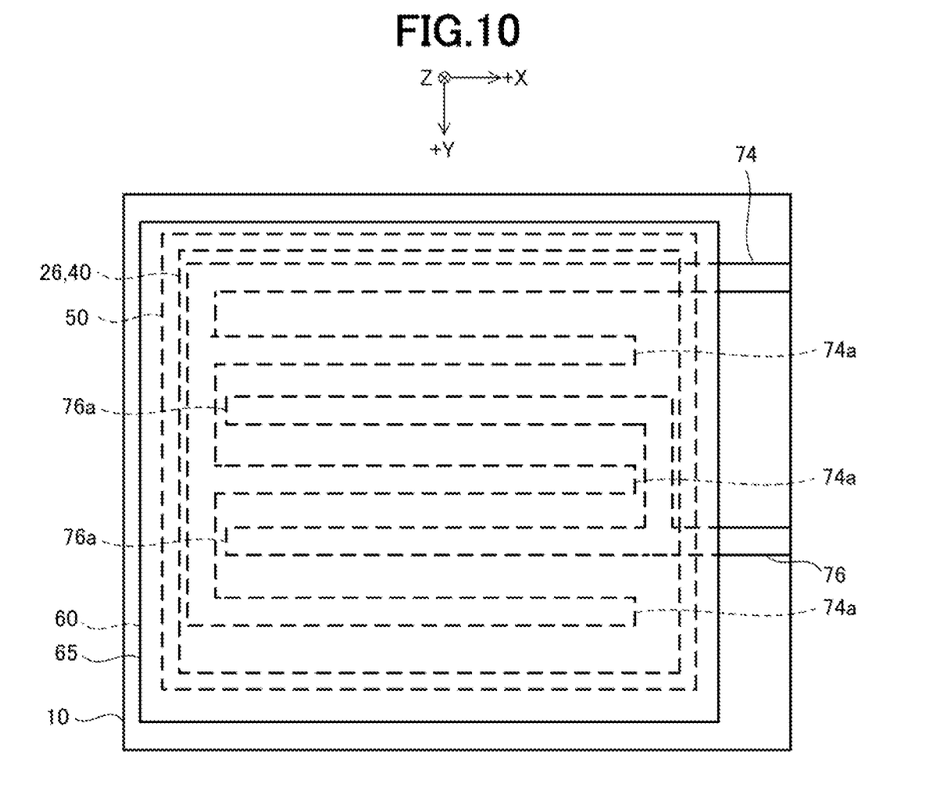
FIG. 10, is a diagram illustrating a first electrode of a first substrate according to a modified example.

Furthermore, the first substrate 10 of Embodiment 1 may include two first electrodes 74 and 76 shaped as comb-like teeth illustrated in FIG. 10 in place of the first electrode 12. The first electrode 74 and the first electrode 76 include a comb-like teeth portion 74a and a comb-like teeth portion 76a, respectively. The high-resistivity layer 40 is provided on the first electrodes 74 and 76. Also, the high-resistivity layer 40 is covered sequentially by the first barrier layer 50 and the second barrier layer 60. In this case, the liquid crystal light deflection apparatus 100 acts on light as a micro lens. Furthermore, this liquid crystal light deflection apparatus 100 also functions as a lenticular lens capable of switching the deflection orientation in two directions.

Figure 11:
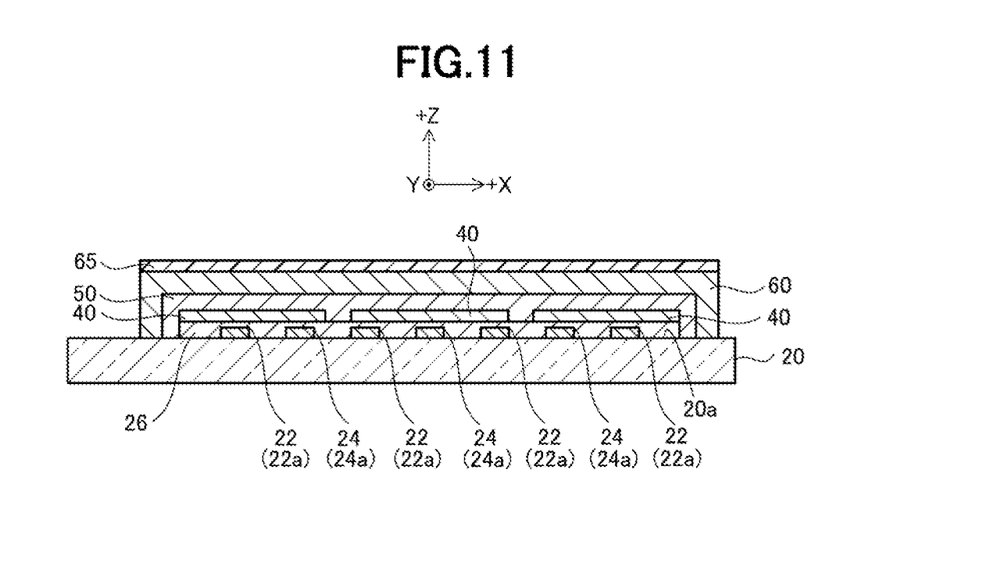
FIG. 11 is a cross sectional diagram illustrating a high-resistivity layer according to a modified example.
Figure 12:
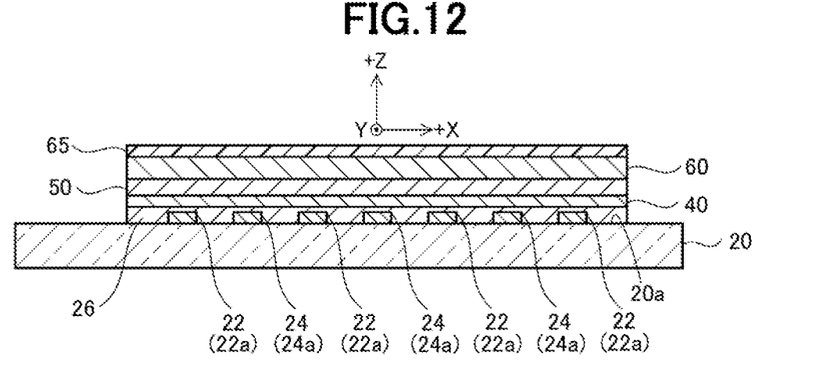
FIG. 12 is a cross sectional diagram illustrating a first barrier layer and a second barrier layer according a modified example.

The high-resistivity layer 40 of Embodiment 1 may be divided into several portions as illustrated in FIG. 11. In Embodiment 2, one high-resistivity layer 40 may be provided on two electrode pairs 28 via the insulation layer 26. Furthermore, it is not necessary for the first barrier layer 50 and the second barrier layer 60 to cover the side surfaces of the high-resistivity layer 40, as illustrated in FIG. 12.

Figure 13:
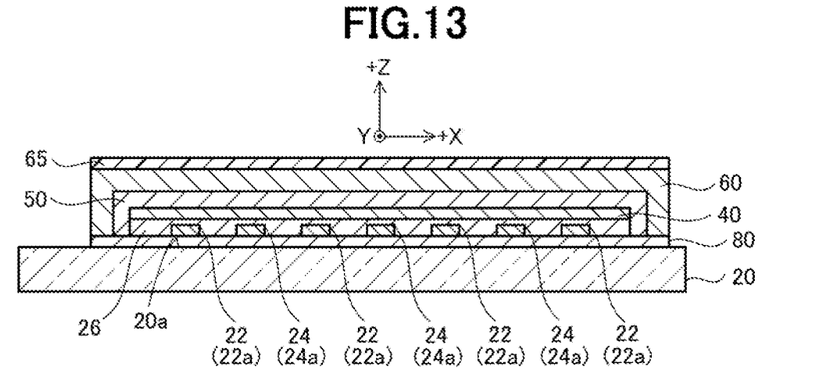
FIG. 13 is a cross sectional diagram illustrating a third barrier layer according to a modified example.

Although the second electrodes 22 and 24 are provided on the first main surface 20a of the second substrate 20, the second electrodes 22 and 24 may be formed upon a third barrier layer 80 provided on the first main surface 20a of the second substrate 20, as illustrated in FIG. 13. The third barrier layer 80, similar to the second barrier layer 60, is formed from metal nitrides or metal carbides. By doing so, the high-resistivity layer 40 can be protected even if the second substrate 20 is a substrate (plastic substrate, for example) through which moisture easily passes.

In Embodiments 1 and 2, although the alignments films 15 and 65 cause the liquid crystals 30 to align in the X direction, the direction in which the alignment films 15 and 65 cause the liquid crystals 30 to be aligned is not limited to the X direction. It is sufficient as long as the alignment films 15 and 65 of Embodiments 1 and 2 cause the liquid crystals 30 to be in homogeneous alignment. For example, the alignment films 15 and 65 may cause the liquid crystals 30 to align in the Y direction.

Although the foregoing describes some examples of preferred embodiments, this detailed description is not to be taken in a limiting sense, and the scope of the invention is defined only by the included claims, along with the full range of equivalents to which such claims are entitled.

Embodiment Examples

Although the following embodiment examples describe the disclosure in greater detail, the embodiment examples are to be regarded in an illustrative sense rather than a restrictive sense.

Figure 14:
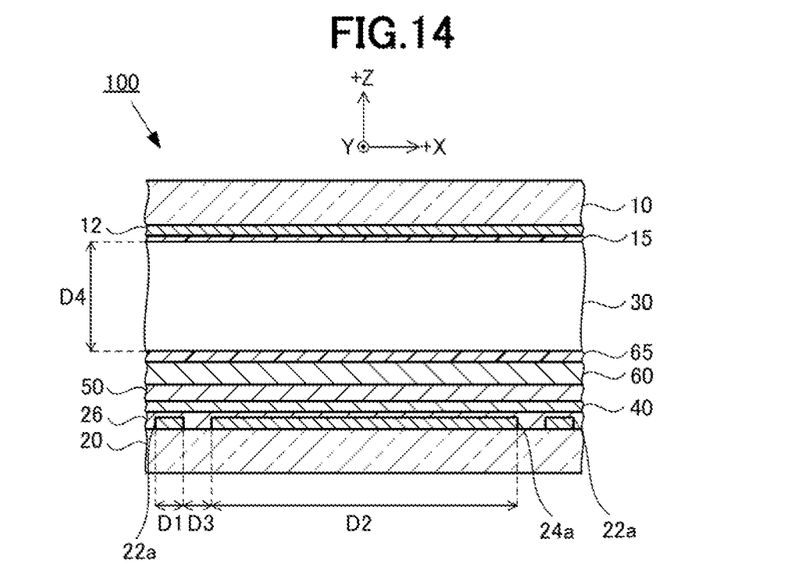
FIG. 14 is a schematic diagram illustrating a cross section of a liquid crystal light deflection apparatus according to an embodiment example.

As an embodiment example, the liquid crystal light deflection apparatus 100 of Embodiment 1 illustrated in FIG. 14 was created. A high-temperature and high-humidity evaluation was performed on the created liquid crystal light deflection apparatus 100. Specifically, the created liquid crystal light deflection apparatus 100 was exposed to an environment of 60° C. and 90% humidity for a predetermined period of time, and then the sheet resistance of the high-resistivity layer 40 and the focal length of the liquid crystal light deflection apparatus 100 was measured. Also, as comparative examples, a liquid crystal light deflection apparatus having a configuration similar to that of the embodiments, except for not having the first barrier layer 50 and the second barrier layer 60, was created. The high-temperature and high-humidity evaluation was performed for the liquid crystal light deflection apparatus of the comparative examples in a manner similar to that of the embodiment examples.

Figure 15:
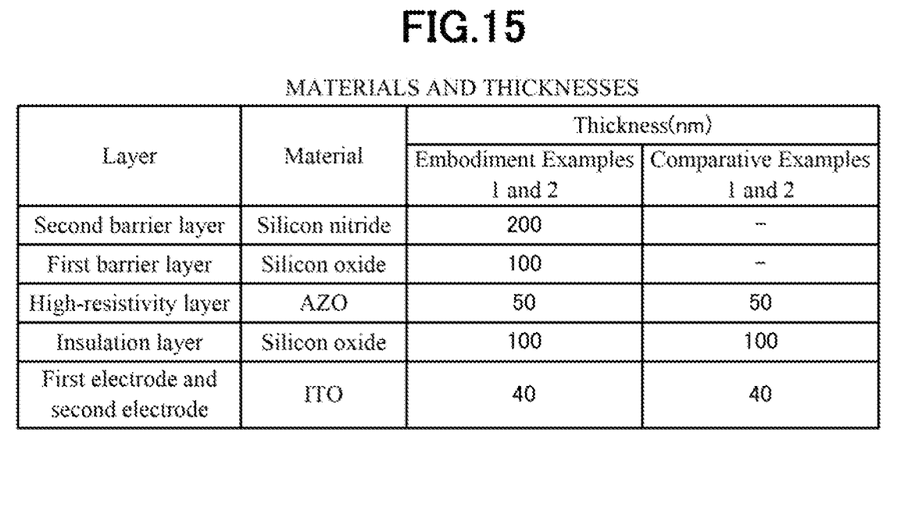
FIG. 15 is a diagram illustrating materials included in layers and thicknesses of the layers of embodiment examples and comparative examples.

The materials included in the layers and the thicknesses of the layers of the liquid crystal light deflection apparatus 100 of the embodiment examples and the liquid crystal light deflection apparatus of the comparative examples are illustrated in FIG. 15.

A liquid crystal light deflection apparatus 100 of Embodiment Example 1 and a liquid crystal light deflection apparatus 100 of Embodiment Example 2 have different composition ratios of AZO that is included in the high-resistivity layer 40. Likewise, a liquid crystal light deflection apparatus 100 of Comparative Example 1 and a liquid crystal light deflection apparatus 100 of Comparative Example 2 have different composition ratios of AZO that is included in the high-resistivity layer 40.

Also, width D1 of the comb-like teeth portion 22a of the second electrode 22 is set to 10 µm and width D2 of the comb-like teeth portion 24a of the second electrode 24 is set to 116.9 µm. Also, the interval D3 between the comb-like teeth portion 22a and the comb-like teeth portion 24a is set to 10 µm. Furthermore, thickness D4 of the liquid crystals 30 is set to 20 µm.

The focal length was measured while applying a voltage of 5V across the first electrode 12 and the comb-like teeth portion 22a of the second electrode 22 and applying a voltage of 1.5V across the first electrode 12 and the comb-like teeth portion 24a of the second electrode 24 at frequencies from 1 Hz to 1500 Hz.

Next, the evaluation result of the liquid crystal light deflection apparatus 100 of the embodiment examples and the liquid crystal light deflection apparatus 100 of the comparative examples are described.

Figure 16:
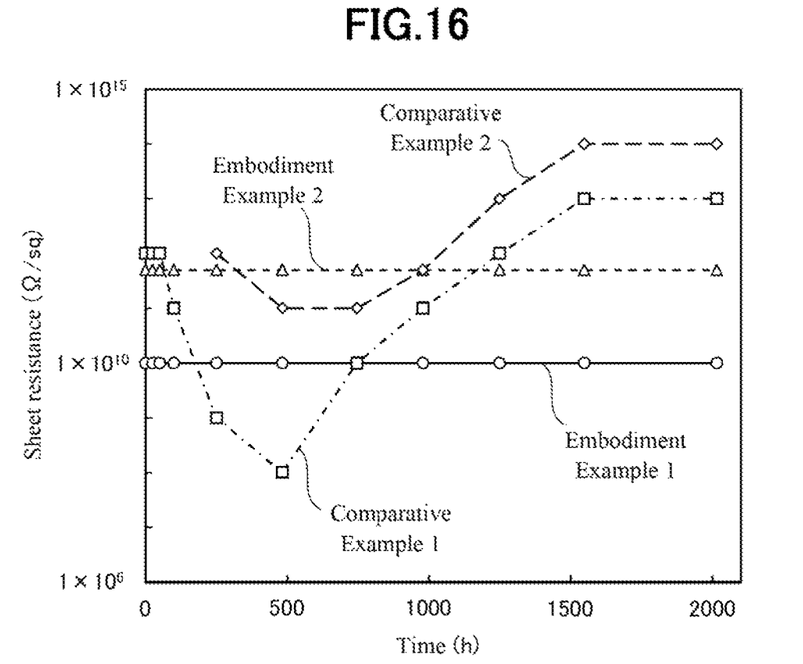
FIG. 16 is a diagram illustrating an evaluation result of sheet resistances of high-resistivity layers of embodiment examples and comparative examples.

FIG. 16 illustrates an evaluation example of sheet resistances of the high-resistivity layer 40 in the embodiment examples and the comparative examples. As illustrated in FIG. 16, the sheet resistance of the high-resistivity layer 40 in the liquid crystal light deflection apparatus 100 in Embodiment Examples 1 and 2 do not undergo changes even when exposed to an environment of 60° C. and 90% humidity for no less than 2000 hours. Conversely, the sheet resistance of high-resistivity layer 40 in the liquid crystal light deflection apparatus in Comparative Examples 1 and 2 change greatly down and up. Therefore, deterioration of the high-resistivity layer 40 can be prevented or suppressed by covering the high-resistivity layer 40 sequentially by the first barrier layer 50 formed from metal oxides and the second barrier layer 60 formed from metal nitrides or metal carbides.

Figure 17:
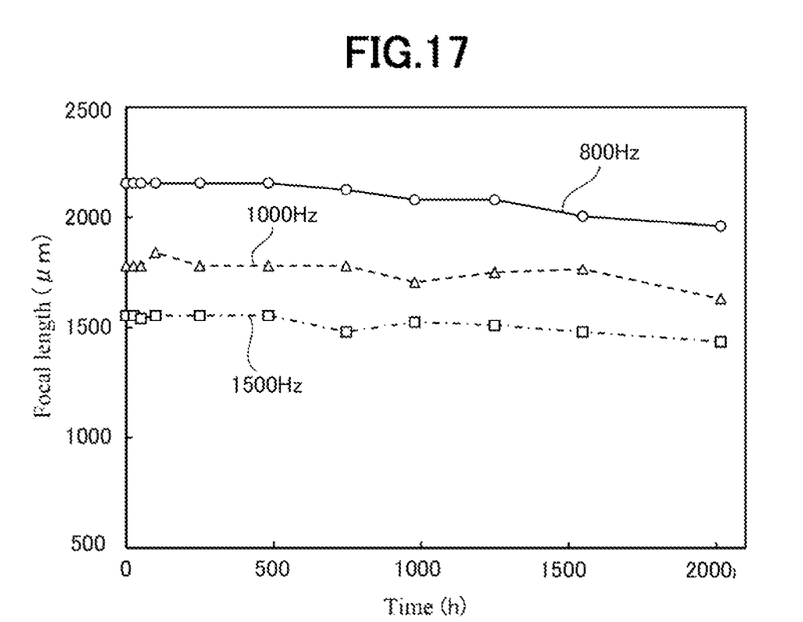
FIG. 17 is a diagram illustrating an evaluation result of focal lengths according to Embodiment Example 1.
Figure 18:
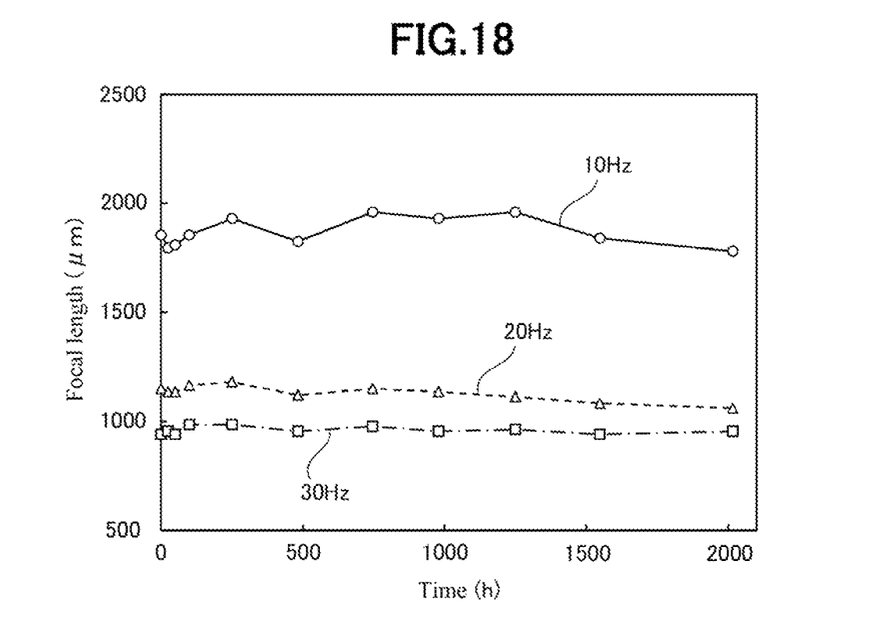
FIG. 18 is a diagram illustrating an evaluation result of focal lengths according to Embodiment Example 2.
Figure 19:
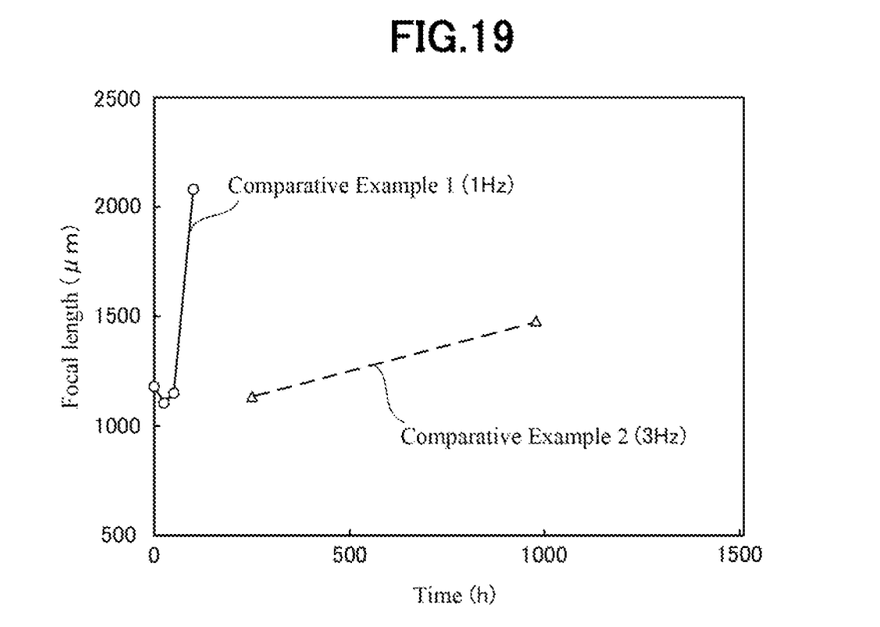
FIG. 19 is a diagram illustrating an evaluation result of focal lengths according to comparative examples.

FIG. 17 illustrates is a diagram illustrating an evaluation result of focal lengths in the liquid crystal light deflection apparatus 100 of Embodiment Example 1. FIG. 18 illustrates an evaluation result of focal lengths in the liquid crystal light deflection apparatus 100 of Embodiment Example 2. Also, FIG. 19 illustrates an evaluation result of focal lengths in the liquid crystal light deflection apparatus 100 of Comparative Examples 1 and 2.

With the liquid crystal light deflection apparatus 100 of Embodiments 1 and 2, the focal lengths remain substantially the same even when exposed to the environment of 60° C. and 90% humidity for no less than 2000 hours, as illustrated in FIGS. 17 and 18. Conversely, with the liquid crystal light deflection apparatus of Comparative Example 1 and 2, the focal length changes no less than 300 μm, as illustrated in FIG. 19. Therefore, the covering of the high-resistivity layer 40 sequentially by the first barrier layer 50 formed from metal oxides and the second barrier layer 60 formed from metal nitrides or metal carbides can prevent or suppress the focal length of the liquid crystal light deflection apparatus 100 from changing over time. That is, this can prevent or suppress the light deflection effect from changing over time. FIG. 19 illustrates focal lengths measurable at the same frequencies because the frequencies at which the focal lengths could be measured changed with the liquid crystal light deflection apparatus of Comparative Examples 1 and 2.

As described above, the covering of the high-resistivity layer 40 sequentially by the first barrier layer 50 formed from metal oxides and the second barrier layer 60 formed from metal nitrides or metal carbides can prevent or suppress deterioration of the high-resistivity layer 40 and can prevent or suppress the light deflection effect of the liquid crystal light deflection apparatus 100 from changing over time.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A liquid crystal light deflection apparatus comprising:
a first substrate including a first electrode;
a second substrate including a second electrode; and
liquid crystals sandwiched between the first substrate and the second substrate,
wherein
an insulation layer and a high-resistivity layer are provided sequentially on at least one of the first electrode or the second electrode,
the high-resistivity layer is covered sequentially by a first barrier layer formed from metal oxide and a second barrier layer formed from metal nitride or metal carbide, and
the first barrier layer covers the high-resistivity layer such that surfaces of the high-resistivity layer are unexposed from the first barrier layer.

2. The liquid crystal light deflection apparatus according to claim 1, wherein the second barrier layer and the high-resistivity layer are not in contact with each other.

3. The liquid crystal light deflection apparatus according to claim 1, wherein at least one of the first electrode or the second electrode is provided on a third barrier layer formed from metal nitride or metal carbide.

4. The liquid crystal light deflection apparatus according to claim 1, wherein the first barrier layer is formed from at least one of silicon oxide, aluminum oxide, tantalum oxide, niobium oxide, titanium oxide, or zirconium oxide.

5. The liquid crystal light deflection apparatus according to claim 1, wherein the second barrier layer is formed from at least one of silicon nitride, silicon oxynitride, silicon carbon nitride, or silicon carbide.

6. The liquid crystal light deflection apparatus according to claim 1, wherein the high-resistivity layer forms a potential gradient at the at least one of the first electrode or the second electrode.

7. A method of manufacturing a liquid crystal light deflection apparatus comprising:
preparing a first substrate including a first electrode and a second substrate including a second electrode;
forming an insulation layer on at least one of the first electrode or the second electrode;
forming a high-resistivity layer on the insulation layer;
forming a first barrier layer from of a metal oxide to cover the high-resistivity layer such that surfaces of the high-resistivity layer are unexposed from the first barrier layer; and
forming a second barrier layer from metal nitride or metal carbide on the first barrier layer.

* * * * *